United States Patent
Pettersson (10) Patent No.: US 10,543,816 B2
(45) Date of Patent: Jan. 28, 2020

(54) SYSTEMS FOR STABILIZING A VEHICLE AND METHOD FOR STABILIZING A VEHICLE

(71) Applicant: Komatsu Forest AB, Umeå (SE)

(72) Inventor: Henry Pettersson, Täfteå (SE)

(73) Assignee: Komatsu Forest AB, Umeå (SE)

( * ) Notice: Subject to any disclaimer, the term of this patent is extended or adjusted under 35 U.S.C. 154(b) by 0 days.

(21) Appl. No.: 15/741,464

(22) PCT Filed: Jun. 8, 2016

(86) PCT No.: PCT/SE2016/050546
§ 371 (c)(1),
(2) Date: Jan. 2, 2018

(87) PCT Pub. No.: WO2017/007393
PCT Pub. Date: Jan. 12, 2017

(65) Prior Publication Data
US 2018/0229695 A1 Aug. 16, 2018

(30) Foreign Application Priority Data
Jul. 3, 2015 (SE) ...................................... 1550960

(51) Int. Cl.
*B60S 9/00* (2006.01)
*B60S 9/10* (2006.01)

(52) U.S. Cl.
CPC ............ *B60S 9/10* (2013.01); *B60Y 2200/22* (2013.01)

(58) Field of Classification Search
CPC ............... B60S 9/10; B60S 9/00; B66C 23/62
See application file for complete search history.

(56) References Cited

U.S. PATENT DOCUMENTS

| 3,349,932 A | 10/1967 | Wagner |
| 3,921,836 A * | 11/1975 | Wyslouch ................ B60K 5/08 180/235 |

(Continued)

FOREIGN PATENT DOCUMENTS

| DE | 29802248 U1 | 6/1998 |
| SE | 532687 C2 | 3/2010 |

OTHER PUBLICATIONS

International Preliminary Report on Patentability received for PCT Patent Application No. PCT/SE2016/050546, dated Jan. 18, 2018, 9 pages.

(Continued)

*Primary Examiner* — Hau V Phan
(74) *Attorney, Agent, or Firm* — Morrison & Foerster LLP (57) ABSTRACT

The invention relates to methods and systems for stabilisation of a vehicle with a chassis including a rear wheel bogie, a pendulum shaft rotatable through rotary bearings around an axis parallel to the longitudinal direction of the vehicle, a tipping arrangement on which a crane is arranged, and a stabilisation arrangement having first and second hydraulic stabilisation actuators in the rear wheel bogie. The tipping arrangement includes a rotating disk and rotary bearings, such that the rotating disk and crane are rotatable around a vertical axis, and first and second hydraulic tipping actuators in connection with the rotating disk, that can be rotated around a horizontal axis. The first stabilisation actuator and first tipping actuator are in fluid-mediated connection, and the second stabilisation actuator and second tipping actuator are in fluid-mediated connection. The stabilisation actuators are controlled based on the pressure at the tipping actuators.

13 Claims, 5 Drawing Sheets

(56) References Cited

U.S. PATENT DOCUMENTS

| | | | | |
|---|---|---|---|---|
| 4,181,315 A | * | 1/1980 | van der Lely | B60K 5/08 180/22 |
| 4,580,797 A | | 4/1986 | Ericsson | |
| 4,823,852 A | * | 4/1989 | Langford | A01G 23/081 144/4.1 |
| 6,152,244 A | * | 11/2000 | Rokbi | E02F 9/0841 173/184 |
| 6,158,539 A | * | 12/2000 | Isley | B62D 33/063 180/89.14 |
| 6,241,263 B1 | * | 6/2001 | Hicks | B60G 9/02 180/89.14 |
| 6,755,270 B2 | * | 6/2004 | Saarinen | B60N 2/14 180/327 |
| 7,694,772 B1 | * | 4/2010 | Doll | B60T 13/686 180/235 |
| 7,832,740 B2 | * | 11/2010 | Kim | E02F 9/028 180/89.15 |
| 8,028,783 B2 | * | 10/2011 | Rust | E02F 9/028 180/89.14 |
| 8,437,925 B2 | * | 5/2013 | Kim | B62D 33/063 172/1 |
| 9,015,969 B2 | * | 4/2015 | Knuth | E02F 3/304 37/444 |
| 2002/0002431 A1 | | 1/2002 | Panizzolo | |
| 2015/0151952 A1 | * | 6/2015 | Kivi | B62D 53/021 701/50 |

OTHER PUBLICATIONS

International Search Report and Written Opinion received for PCT Patent Application No. PCT/SE2016/050546, dated Aug. 31, 2016, 12 pages.

* cited by examiner

SYSTEMS FOR STABILIZING A VEHICLE AND METHOD FOR STABILIZING A VEHICLE

CROSS REFERENCE TO RELATED APPLICATIONS

This application is a U.S. National Phase patent application of PCT/SE2016/050546, filed Jun. 8, 2016, which claims priority to Swedish Patent Application No. SE 1550960-7, filed Jul. 3, 2015, the disclosures of which are incorporated herein by reference in their entirety.

TECHNICAL AREA

The present invention concerns systems and methods for stabilizing a vehicle using wheel bogies. The invention concerns also hydraulic actuators for stabilizing a vehicle.

BACKGROUND

Vehicles today, in particular terrain-going vehicles, are often driven on uneven ground and may impact impediments of various types. In order to deal with such irregularities and impediments while maintaining comfort and without the vehicle tipping over, it is important that sufficient contact between the wheels of the vehicle and the ground is ensured. Vehicles are, therefore, often designed with wheel bogies that cause the wheels to follow irregularities of the ground. A wheel bogie is a supplementary chassis that can be rotated relative to the principal chassis or frame of the vehicle. A wheel bogie normally has four wheels, which by means of wheel-supporting pendulum arms spread the load of the vehicle onto a greater number of axles and reduce the axle pressure, increase the load-bearing capacity, and improve the vehicle's handling when taking curves. A wheel bogie allows rotation around an axis that is parallel to the longitudinal direction of the vehicle and, in particular in the case of terrain-going vehicles, in combination with the ability to rotate around an axis that is perpendicular to the longitudinal direction of the vehicle. The pendulum arms may, as one alternative, be individually mounted to rotate, i.e. jointed at bearings at one of the ends, or they may be of a rigid, centrally mounted type consisting of a pendulum arm, such as, for example, a pendulum shaft designed to be rotated around a rotary bearing located at the centre of the pendulum shaft.

Terrain-going vehicles, such as forestry machines, comprise a crane with a crane arm that can be extended far from the vehicle and at the free end of which a tool, such a gripper or a harvester, can be attached. The crane and its load, which is located at the farthest extent of the arm, constitute a significant part of the vehicle and influence the position of its centre of gravity when the crane arm is extended from the vehicle. This leads to a torque that influences the vehicle in different directions, depending on the rotational position of the crane in the horizontal plane and its extension from the vehicle. Thus, if the crane is directed forwards, a torque is created in the forwards direction, while if the crane has been turned to one side a torque is created towards the side. In order to prevent the vehicle tipping over as a consequence of the torque that has arisen, the said torque must be counteracted and balanced, which takes place by means of a stabilisation arrangement. Such a stabilisation arrangement is particularly important when the vehicle is an articulated vehicle. An articulated vehicle comprises two chassis parts that are united with each other in a jointed manner, a forward frame and a rear frame that can be rotated by being set at an angle through a jointed waist, which makes the vehicle flexible and easy to maneuver. One disadvantage of articulated vehicles, however, is that such a vehicle is less stable when it is driven around a curve, since the centre of gravity of the vehicle is at the same time displaced.

One disadvantage of prior art stabilisation arrangements is that they are designed to be used principally when the vehicle is stationary. A further disadvantage of prior art stabilisation arrangements is that they are based on static calculations based on a series of parameters that have been determined in advance, for example based on the rotational position of the crane in the horizontal plane. Since the displacement of the centre of gravity of a vehicle is influenced by forces and torques that are not only static but also dynamic, the counteracting forces that are calculated in order to balance the vehicle will not always correspond to the actual or true torque that arises at the vehicle due to the displacement of the centre of gravity that occurs. The latter is particularly troublesome when the vehicle is in motion and subject to dynamic and more or less unpredictable forces and torques that do not necessarily depend on the rotational position of the crane.

Document SE 532683 describes a system for the stabilisation of a vehicle comprising actuators that generate a support force on a pendulum shaft in order to counteract rotation and imbalance of the vehicle that arise during rotation of the crane of the vehicle. The support force that is required to counteract the rotation is determined based on calculations based on the rotational position of the crane in the horizontal plane. Document WO2013178886 describes a system to stabilise a forestry machine where the torque that acts on a part of the chassis is determined, after which the magnitude and direction of a counteracting torque are determined.

Despite the prior art solutions within the technical area, there is a requirement to achieve a system for the stabilisation of vehicles that is effective and safe, that can be applied when the vehicle is being driven, and that minimises the risk of the vehicle tipping over.

SUMMARY OF THE INVENTION

One purpose of the present invention is to provide a system for the stabilisation of a vehicle that is effective and safe and that minimises the risk of the vehicle tipping over.

A further purpose of the invention is to provide a system for the stabilisation of a vehicle that can be used when the vehicle is being driven.

A further purpose of the present invention is to provide a method for the stabilisation of a vehicle that is effective and safe and that minimises the risk of the vehicle tipping over.

A further purpose of the invention is to provide a method for the stabilisation of a vehicle that can be used when the vehicle is being driven.

Certain of these purposes are achieved with a system for the stabilisation of a vehicle according to claim 1. Other purposes are achieved with a vehicle according to claim 11. Other purposes are achieved with a method according to claim 14. Advantageous embodiments are specified in the non-independent claims.

According to one aspect of the invention, a system is provided for the stabilisation of a vehicle, comprising a rear wheel bogie arranged at the chassis of the vehicle, whereby the rear wheel bogie comprises a pendulum shaft that can be rotated around an axis that extends parallel to the longitudinal direction of the vehicle; a tipping arrangement arranged at the chassis on which a crane is arranged, whereby the tipping arrangement comprises a rotating disk arranged on rotary bearings such that the rotating disk and thus also the crane can rotate around a vertical axis; and a hydraulic stabilisation arrangement comprising two stabilisation actuators, arranged at the rear wheel bogie. The tipping arrangement further comprises two hydraulic tipping actuators arranged in connection with the rotating disk, such that the rotating disk can be rotated around a horizontal axis relative to the chassis, whereby the stabilisation actuators are arranged in fluid-mediated connection with the tipping actuators and are in this way arranged to be controlled on the basis of the pressure at the tipping actuators.

The term "vertical axis" is here used to denote an axis that extends essentially perpendicular to the ground on which the vehicle is being driven. The term "horizontal axis" is here used to denote an axis that extends essentially parallel to the ground on which the vehicle is being driven. Thus, a vertical axis extends essentially perpendicular to a horizontal axis. A horizontal axis may be an axis that extends parallel to the longitudinal or principal axis of the vehicle.

It is preferable that the tipping actuators be arranged such that the rotating disk can be rotated around a horizontal axis parallel to the longitudinal direction of the vehicle and/or in a cardan manner around a horizontal axis essentially perpendicular to the longitudinal direction of the vehicle. It is preferable that the tipping arrangement comprise a tipping plate that is arranged at a tipping link. The rotating disk and the rotary bearings are arranged at the tipping plate.

Through the crane being arranged at a tipping arrangement comprising a rotating disk on rotary bearings, it is possible for the crane to be rotated around a vertical axis, outwardly towards the sides relative to the centre line of the vehicle. Thus the position of the crane can be defined by an angle of rotation relative to a normal position parallel to the centre line of the vehicle. It is appropriate that the position directly ahead of the principal direction of travel of the vehicle, parallel to the centre line of the vehicle, constitute the normal position and thus an angle of rotation of 0°. Thus, when the crane is directed directly backwards, it is positioned at an angle of rotation of 180°. Thus, when the crane is directed directly to the side, it is positioned with an angle of rotation of 90° or 270°, to the right or left relative to the centre line of the vehicle. A torque that influences the tipping arrangement is obtained depending on the position of the crane relative to the centre line of the vehicle. The torque that is obtained depends on the load and position of the crane. The torque leads to the tipping arrangement being rotated around a horizontal axis, whereby the hydraulic tipping actuators and their pressure are influenced. Since the stabilisation actuators are in fluid-mediated connection with the tipping actuators, the pressure at the stabilisation actuators will be changed when the pressure at the tipping actuators is changed. Thus, the stabilisation actuators are controlled on the basis of the pressure at the tipping actuators that is caused by the crane. In this way, an adaptive and load-sensitive hydraulic stabilisation arrangement is obtained that senses the actual torques that arise. A system for the stabilisation of a vehicle that is effective and safe and that can be used while the vehicle is being driven is in this way achieved.

Due to the fact that the present system uses a tipping arrangement that senses the actual or true displacement of the centre of gravity by measuring the forces and torques that arise in the rotating disk, i.e. in the interface between an upper part that supports a driver's cabin and a crane that can rotate freely relative to a lower carriage or chassis, a number of significant advantages over prior art technology are obtained. While the prior art technology, as described in, for example, SE 532683, uses a counteracting force in the stabilisation actuators that has been determined in advance, which force is based on static calculations based on the rotational position of the crane, it should be understood that the present invention works instead in an active and dynamic manner. To be more precise, the present invention differs in that it senses the actual or true torque that arises in the said interface due to the displacements of the centre of gravity that occurs. A stabilisation system is in this way obtained that can balance the vehicle by creating a counteracting force also in the cases in which the crane is located in its normal position at 0°, for example if the vehicle lurches when being driven in terrain.

It is appropriate that a cabin be arranged at the tipping arrangement. The cabin and the crane will in this way move together in the same direction.

BRIEF DESCRIPTION OF THE DRAWINGS

An embodiment of the invention will be described below in more detail with reference to the attached drawings, of which.

DETAILED DESCRIPTION OF THE DRAWINGS

Figure 1:
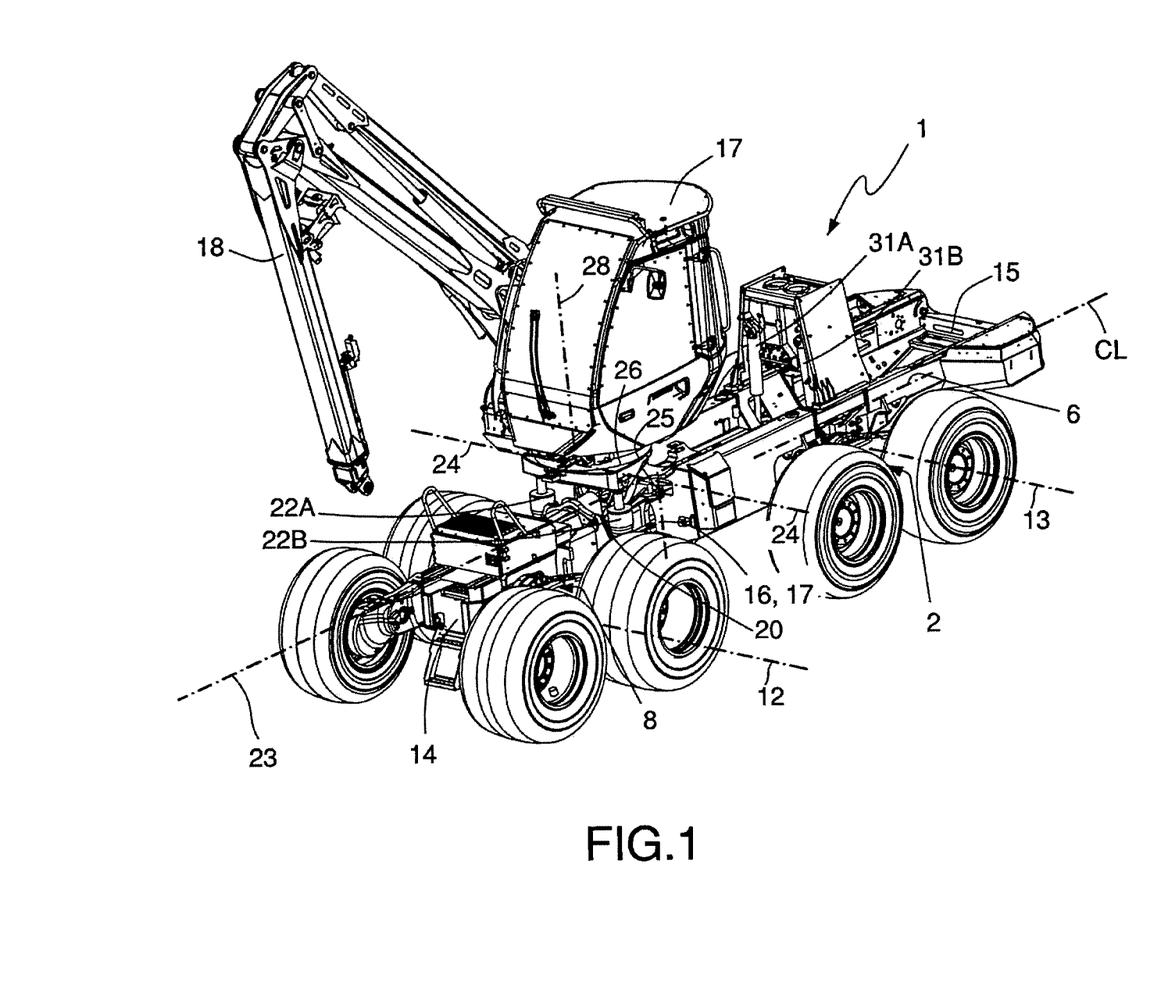
FIG. 1 shows a view in perspective of a vehicle equipped with a crane and comprising a system for stabilisation according to the invention.
Figure 3:
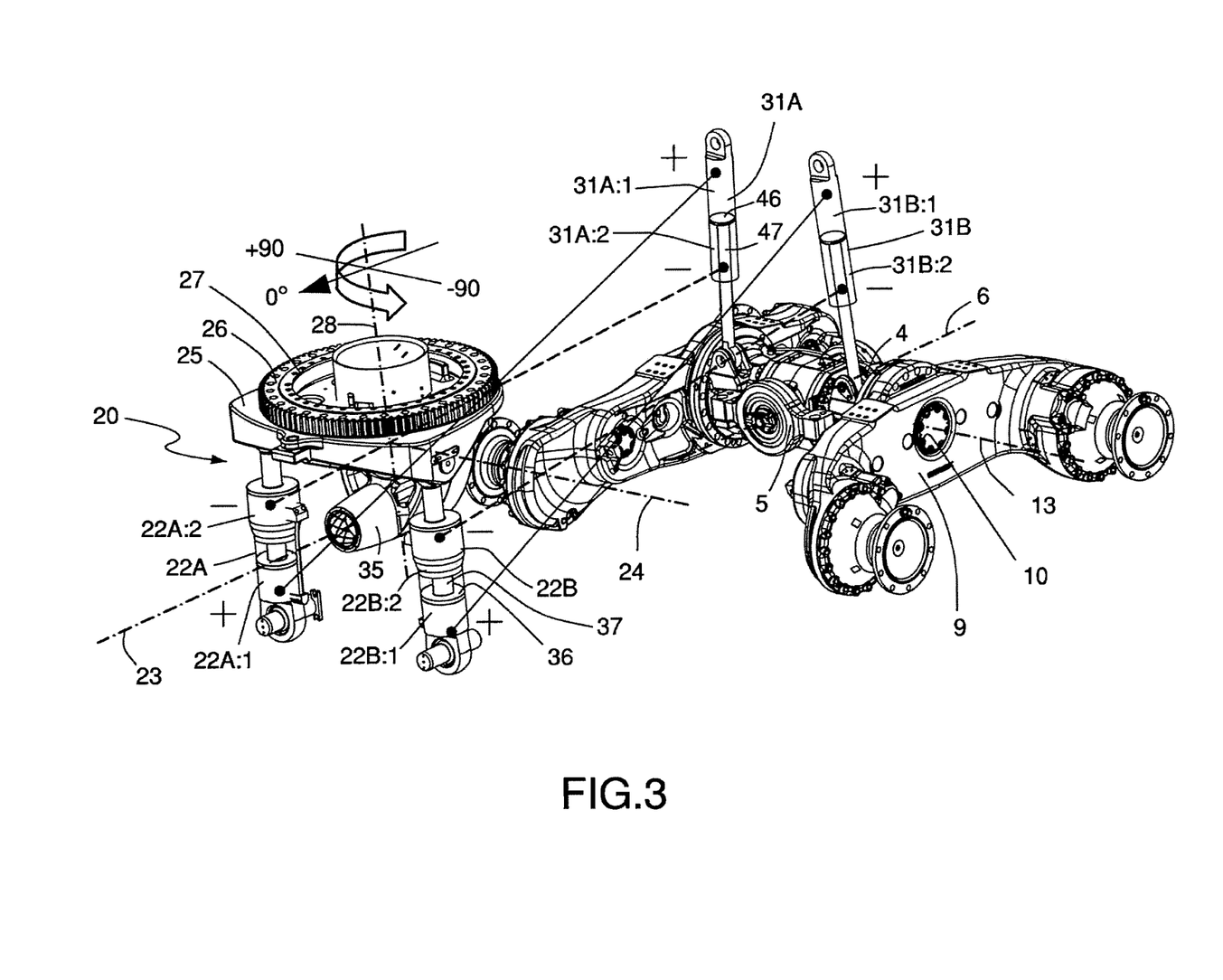
FIG. 3 shows schematically a hydraulic circuit for the stabilisation of a vehicle according to the invention, whereby the crane has been turned to a first rotational position at 0° to the principal axis of the vehicle and thus directed directly forwards in the normal direction of travel of the vehicle.
Figure 4:
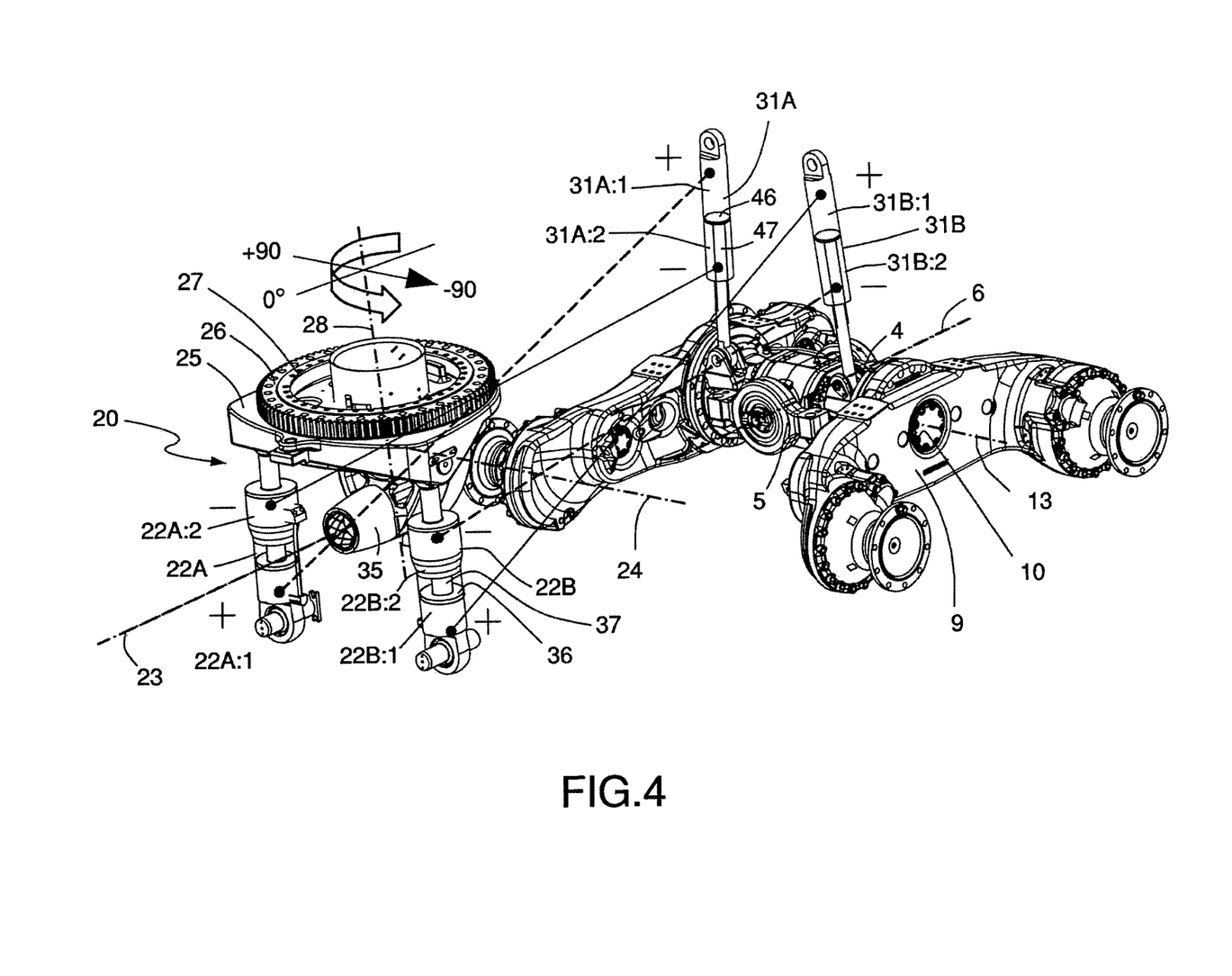
FIG. 4 shows schematically a hydraulic circuit corresponding to FIG. 3 but in a position in which the crane has been rotated to a second rotational position 270° to the principal axis of the vehicle and thus directed perpendicularly to the left, when seen in the normal direction of travel of the vehicle.

FIG. 1 shows schematically a vehicle comprising a system for stabilisation according to one embodiment of the present invention. The vehicle is articulated and comprises a chassis that is generally denoted by reference number 1. With reference also to FIGS. 3 and 4, the system comprises a rear wheel bogie 2 arranged at the chassis 1, whereby the rear wheel bogie 2 comprises a rigid, centrally mount pendulum shaft 4 designed to be rotated around rotary bearings 5 located at the centre of the pendulum shaft such that the pendulum shaft can oscillate around an axis 6 that extends parallel to the longitudinal direction or principal axis, denoted "CL", of the vehicle. The vehicle comprises further a forward wheel bogie 8 arranged at the chassis. Two pairs of wheels are arranged at each wheel bogie, one on each side of the longitudinal axis of the vehicle. The forward wheel bogie 8 and the rear wheel bogie 2 can be rotated, through their respective bogie arm 9 (bogie box) and a rotation joint 10 located at the centre of this arm, around the relevant horizontal axis 12, 13 that extends essentially perpendicular to the longitudinal direction of the vehicle. As a consequence of the bogie, the ability of the vehicle to cope with irregularities in the ground over which the vehicle is being driven is improved. The chassis 1 comprises a forward frame and a rear frame 14, 15, connected through an articulated joint 16. The articulated joint 16 rotates around a vertical axis. The forward frame 14 and the rear frame 15 can in this way rotate in a sideways direction relative to each other. The vehicle comprises control cylinders (not shown in the drawings) that are active at the articulated joint. The forward wheel bogie 8 is arranged at the forward frame 14 and the rear wheel bogie 2 is arranged at the rear frame 15. A cabin 17 and a crane 18 are arranged at a tipping arrangement 20 at the forward frame 14 of the chassis. The tipping arrangement 20 comprises first and second hydraulic tipping actuators 22A, 22B that make it possible to rotate the cabin 17 and the crane 18 around a horizontal axis 23 parallel to the longitudinal direction of the vehicle and, in the embodiment described here, also around a horizontal axis 24 essentially perpendicular to the longitudinal direction of the vehicle. The tipping arrangement 20, which is located at the forward frame 14, comprises further a rotating disk 26 on rotary bearings 27, which make it possible to rotate the crane 18 and the cabin 17 around a vertical axis 28. A hydraulic stabilisation arrangement 30 comprising first and second hydraulic stabilisation actuators 31A, 31B is arranged at the rear wheel bogie 2. The first and second stabilisation actuators 31A, 31B follow the motions of the pendulum arm and in this way improve comfort when the vehicle is driven over irregular ground. The first and second stabilisation actuators 31A, 31B are arranged in fluid-mediated connection with the said first and second hydraulic tipping actuators 22A, 22B, and in this way are arranged to be controlled on the basis of the pressure at the tipping actuators. It is appropriate that the tipping actuators 22A, 22B be parallel and arranged one on each side of the centre line or longitudinal axis of the vehicle. It is appropriate that the first and second stabilisation actuators 31A, 31B be arranged in a parallel manner one on each side of the principal axis of the vehicle. The stabilisation actuators 31A, 31B are arranged in fluid-mediated connection with corresponding tipping actuators 22A, 22B on the same side of the central principal axis of the vehicle. This is to say that the first stabilisation actuator 31A is in fluid-transfer connection with the corresponding first tipping actuator 22A on one side and, in a corresponding manner, the second stabilisation actuator 31B is in fluid-transfer connection with a second tipping actuator 22B on the other side. Or, in other words, the said first stabilisation actuator 31A and the first tipping actuator 22A are arranged in fluid-mediated connection, while the said second stabilisation actuator 31B and the second tipping actuator 22B are arranged in fluid-mediated connection, whereby the stabilisation actuators are controlled on the basis of the pressure at the tipping actuators. The tipping arrangement 20 and the stabilisation arrangement 30 are described in more detail in association with FIGS. 2, 3 and 4.

Figure 2:
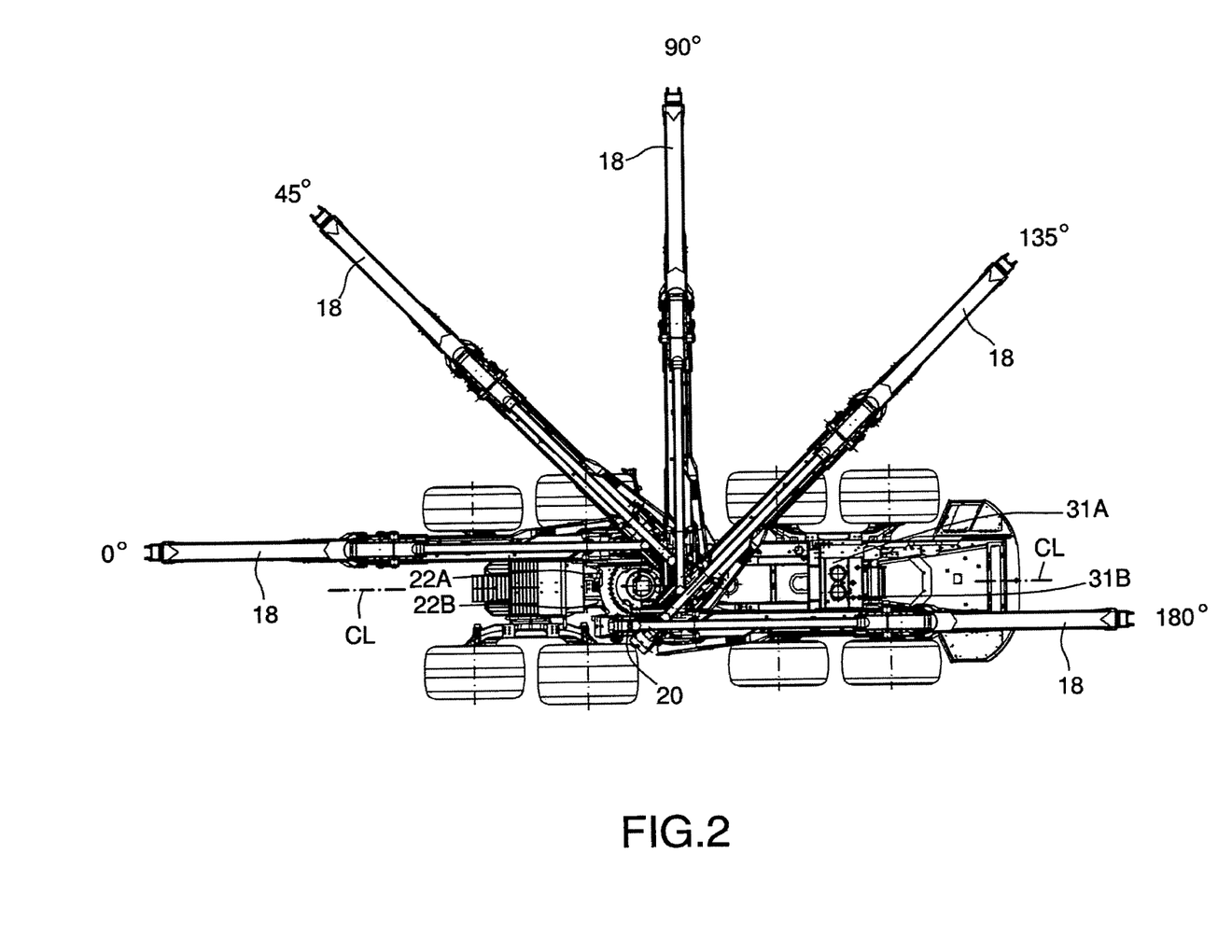
FIG. 2 shows a view from above of the vehicle in FIG. 1 with a crane that is a component of the vehicle set into several rotational positions in the horizontal plane.

FIG. 2 shows schematically a vehicle 1 comprising a system 100 for stabilisation according to one embodiment of the present invention. The vehicle is shown in a view from above. The vehicle is designed as described in FIG. 1. Through the crane 18 being arranged at a tipping arrangement 20 comprising a rotating disk 26 on rotary bearings 27, it is possible that the crane be rotated around a vertical axis 28, outwardly towards the sides relative to the centre line CL of the vehicle. Thus the position of the crane 18 can be defined by an angle of rotation relative to a normal position parallel to the centre line CL of the vehicle. The position directly ahead in the principal direction of travel of the vehicle, parallel to the centre line CL of the vehicle, can be said to constitute a normal position and thus an angle of rotation of 0°. Thus, when the crane 18 is directed directly backwards, it is positioned at an angle of rotation of 180°. Thus, when the crane 18 is directed to the side, directly to the right or left relative to the centre line CL of the vehicle, it is positioned at an angle of rotation of 90° or 270° (−90°). A torque that influences the tipping arrangement 20 is generated depending on the position of the crane 18 relative to the centre line CL of the vehicle such that the tipping arrangement is rotated either around the horizontal axis 23 parallel to the centre line of the vehicle or around the horizontal axis 24 essentially perpendicular to the centre line of the vehicle. The torque that arises depends on the load and position of the crane. If the torque that is generated by the crane 18 is not counteracted, i.e. not balanced by a counteracting force, the vehicle tends to tip over in the direction of the torque. The further away from the vehicle that the crane is extended, the greater will be the torque that is obtained, and the greater will be the risk that the vehicle tips over, if the torque is not counteracted. Thus the torque leads to the tipping arrangement 20 being rotated around a horizontal axis 23, whereby the hydraulic tipping actuators 22A, 22B and their internal pressure are influenced. Since the stabilisation actuators 31A, 31B are in fluid-mediated connection with the tipping actuators 22A, 22B, also the pressure at the stabilisation actuators will be changed when the pressure at the tipping actuators is changed. Thus, the stabilisation actuators 31A, 31B are controlled on the basis of the pressure at the tipping actuators that is caused by the crane. The stabilisation actuators 31A, 31B are arranged in fluid-mediated connection with the tipping actuators 22A, 22B, such that the pressure at the stabilisation actuators leads to a force that counteracts the torque that has arisen. A hydraulic load-sensitive stabilisation arrangement is in this way achieved that generates a counteracting force that is directly proportional to the torque that has arisen. A stabilisation system for a vehicle is in this way achieved that is effective and safe and that can be used while the vehicle is being driven. Due to the fact that the present system is hydraulically load-sensitive and uses a tipping arrangement 20 that senses the actual or true displacement of the centre of gravity that is generated as a consequence of the rotational position of the crane 18 and measures the forces and torques that arise in the rotating disk 26 and rotary bearings 27, i.e. in the interface between an upper part supporting the driver's cabin and the crane that can rotate freely relative to a lower carriage or a chassis at the vehicle, significant advantages over prior art technology are obtained. The tipping torque of the crane 18 that is created and the counteraction of the pendulum bogie 2 are directly proportional to the tipping torque (the load) of the crane. The system is hydraulically load-sensitive. If the crane 18 is rotated in the opposite direction, the counteraction and the pressure will be the opposite.

FIG. 3 shows schematically a system for the stabilisation of a vehicle according to the present invention. The vehicle 1 is designed in the manner that is described in FIGS. 1 and 2, whereby the crane 18 is positioned directly forwards in the principal direction of travel of the vehicle. Thus, the crane 18 has a position with an angle of rotation of 0°, which is illustrated in the drawing with an arrow. The tipping arrangement 20 comprises a tipping plate 25 that is arranged at a tipping link 35 including a unit with the aid of which the tipping plate 25 is suspended in a cardan manner and rotationally displaceable around two perpendicular axes including the said horizontal axis 23, parallel to the longitudinal direction of the vehicle, and the said horizontal axis 24, perpendicular to the longitudinal direction of the vehicle. The said rotating disk 26 and the rotary bearings 27 are arranged at the tipping plate 25. The first and second tipping actuators 22A, 22B thus allow, through the tipping link 35, the tipping plate 25 to be rotated around the said horizontal axis 23 parallel to the longitudinal direction of the vehicle and around the said horizontal axis 24 perpendicular to the longitudinal direction of the vehicle.

Each tipping actuator 22A, 22B is constituted by a double-action hydraulic cylinder comprising a piston 36 and a piston rod 37, whereby first and second chambers 22A:1, 22B:1; 22A:2, 22B:2, respectively, are formed on each side of the piston 36. The first chamber and the second chamber have variable volumes that depend on the position of the piston in the cylinder. The tipping actuators 22A, 22B are so arranged that the second chamber 22A:2; 22B:2, the piston rod chamber, is arranged closest to the crane 18, while the first chamber 22A:1; 22B:1, the piston chamber, is arranged closest to the ground over which the vehicle is being driven. The tipping actuators 22A, 22B may be known also as "tipping cylinders". When a tipping actuator 22A, 22B is compressed or pressed into a withdrawn condition, the piston 36 moves in a direction such that the first chamber 22A:1; 22B:1 is reduced and the second chamber 22A:2; 22B:2 is expanded. When the first chamber 22A:1; 22B:1 is reduced, a high pressure is achieved in the first chamber relative to the pressure at the second chamber 22A:2; 22B:2, which is, in this way, lower. In a corresponding manner, the first chamber 22A:1; 22B:1 is expanded and the second chamber 22A:2; 22B:2 is reduced when the tipping cylinder takes up an extended condition. A high pressure is in this way caused at the second chamber 22A:2; 22B:2 relative to the pressure at the first chamber 22A:1; 22B:1.

Each stabilisation actuator 31A, 31B is constituted in a similar manner by a double-action hydraulic cylinder comprising a piston 46 and a piston rod 47, whereby a first chamber 31A:1, 31B:1, i.e. a piston chamber, is formed at a first side of the piston, and a second chamber 31A:2, 31B:2 enclosing the piston rod, i.e. a piston rod chamber, is formed at a second side of the piston. The first chamber 31A:1, 31B:1 and the second chamber 31A:2, 31B:2 have variable volumes that depend on the position of the piston 46 in the cylinder. The stabilisation actuators 31A, 31B are so arranged that their second chambers 31A:2, 31B:2 are located closest to the ground on which the vehicle is being driven. The stabilisation actuators may be known also as "stabilisation cylinders". The stabilisation actuators 31A, 31B are so arranged that when a stabilisation actuator is compressed or pressed into a withdrawn condition, the first chamber 31A:1, 31B:1 is reduced and the second chamber 31A:2, 31B:2 is expanded. In a corresponding manner, the first chamber 31A:1, 31B:1 is expanded and the second chamber is reduced when the stabilisation cylinder takes up an extended condition.

The cylinder cross-sectional areas of the stabilisation actuators 31A, 31B are considerably smaller than the cylinder areas of the tipping actuators 22A, 22B. The piston areas of the stabilisation actuators 31A, 31B are as a consequence considerably smaller than the piston areas of the tipping actuators 22A, 22B. As a consequence of this, the motion at the tipping arrangement 20 will be smaller than the motion at the stabilisation arrangement 30. A change in pressure at the tipping actuators 22A, 22B thus leads to a larger displacement of the piston 46 and the piston rod 47 at the corresponding stabilisation actuator 31A, 31B than the effect that a change in pressure at the stabilisation actuators 31A, 31B has on the piston 36 and piston rod 37 of the tipping actuators.

The first chamber 31A:1, 31B:1 at each stabilisation actuator 31A, 31B is arranged in fluid-mediated connection with the first chamber 22A:1; 22B:1 at the tipping actuator 22A, 22B that is arranged on the same side of the centre line of the vehicle, while the second chamber 31A:2, 31B:2 at each stabilisation actuator 31A, 31B is arranged in fluid-mediated connection with the second chamber 22A:2; 22B:2 at the tipping actuator 22A, 22B arranged on the same side.

Figure 5:
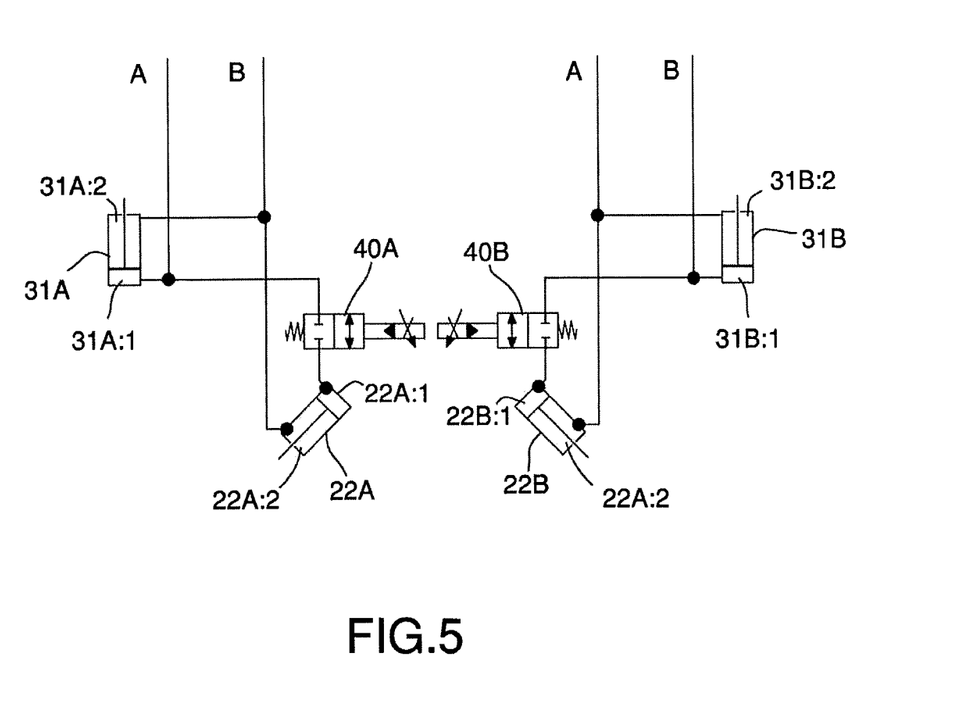
FIG. 5 shows a hydraulic diagram of the system according to the invention for the stabilisation of a vehicle.

As is shown in FIG. 5, first and second stabilisation valves 40A, 40B are arranged in fluid-mediated connection with a tipping actuator 22A and a stabilisation actuator 31A, while the second stabilisation valve 40B is arranged in fluid-mediated connection with a second tipping actuator 22B. The stabilisation valve 40A, 40B can be arranged in connection to the first chamber 22A:1; 22B:1; 31A:1, 31B:1 at the relevant tipping actuator 22A, 22B and stabilisation actuator 31A, 31B. It is appropriate that the stabilisation valves 40A, 40B are constituted by electrically controlled valves. They are shown in the drawing in their non-activated, non current-carrying condition. It is appropriate that a control unit (not shown in the drawings) be arranged in connection with the stabilisation valves, whereby the control unit can switch the stabilisation valves between their open condition and their closed condition. When the vehicle is being driven along a transport road, the stabilisation valves 40A, 40B are appropriately set in a current-carrying open condition. In this way, the first chamber 22A:1; 22B:1; 31A:1, 31B:1 at the relevant stabilisation actuator 31A, 31B is in fluid-mediated connection with the first chamber at the relevant tipping actuator 22A, 22B during transport, whereby the stabilisation actuators are continuously controlled on the basis of the pressure at the tipping actuators 22A, 22B. The stabilisation actuators 31A, 31B continuously generate in this way a force that counteracts the torque that is caused by the crane 18.

A condition is illustrated in FIG. 3 in which the crane 18 is at an angle of rotation of 0° while the vehicle is being driven forwards or backwards. The position and load of the crane 18 lead in this case to a torque being generated, as will be realised if FIG. 2 is studied. The torque influences the tipping arrangement 20 such that the tipping plate 25 is rotated forwards around the horizontal axis 24 that is essentially perpendicular to the centre line CL of the vehicle. When the tipping plate 25 is rotated around the horizontal axis 24 in the direction of the torque, the tipping actuators 22A, 22B are compressed. Herewith, the first chamber 22A:1, 22B:1 at the relevant tipping actuator 22A, 22B is set under pressure and reduced in volume, whereby a high pressure is achieved at the relevant first chamber. This is illustrated by a plus symbol in the drawing. At the same time, the second chamber 22A:2, 22B:2 at the relevant tipping actuator 22A, 22B is expanded, whereby a relatively low pressure at the relevant second chamber is achieved. This is illustrated by a minus symbol in the drawing. Since the first chamber 31A:1; 31B:1 at the relevant stabilisation actuator 31A, 31B is arranged in fluid-mediated connection with the first chamber 22A:1; 22B:1 at the tipping actuators 22A, 22B, a high pressure is achieved also at the first chambers of the stabilisation actuators. This is illustrated in a similar manner by a plus symbol in the drawing. When the pressure at the first chamber 31A:1, 31B:1 at the relevant stabilisation actuator 31A, 31B becomes high, the pressure influences the piston 46, and the first chamber 31A:1, 31B:1 at the said stabilisation actuator is expanded. This fluid-mediated connection that operates with a relatively high pressure and lies between the said tipping actuators 22A, 22B and stabilisation actuators 31A, 31B is illustrated in the drawing with a solid line. When the vehicle is being driven across uneven ground, the pendulum shaft 4 will be rotated around the rotary bearings 5 and the horizontal axis 6 parallel to the centre line of the vehicle. When the first chambers 31A:1, 31B:1 of the stabilisation actuators 31A, 31B are exposed to a similarly high pressure, the rear wheel bogie 2 will follow the ground in a smooth and flexible manner. Since the crane 18 is directed directly forwards in the principal direction of travel of the vehicle, the chassis is not influenced in the sideways direction and thus no counteracting force worthy of mention is achieved at the stabilisation actuators 31A, 31B.

FIG. 4 illustrates schematically a condition in which the crane 18 is positioned directly to the side relative to the centre line CL of the vehicle. Thus, the crane 18 has been rotated to a position essentially at 90° to the left relative to the centre line of the vehicle. When the vehicle is driven forwards or backwards and the crane has been rotated by 90° relative to the centre line of the vehicle, the crane generates a torque that is directed in the same direction as the crane, which will be realised if FIG. 2 is studied. The torque influences the tipping arrangement 20 such that the tipping plate 25 is rotated around the horizontal axis 23 that is parallel to the centre line CL of the vehicle. The tipping arrangement 20 is thus in this way tilted to the left when viewed in the normal forwards direction of motion of the vehicle. The tipping actuator 22B that is arranged on the left side of the centre line CL is in this way compressed at the same time as the tipping actuator 22A on the right side of the centre line achieves an extended condition. The first chamber 22B:1 at the left tipping actuator 22B is in this way reduced and achieves a relatively high pressure. At the same time, the volume of the second chamber 22A:2 at the right tipping actuator 22A is reduces, and achieves a high pressure. Since the pressure in the first chamber 22B:1 at the left tipping actuator 22B is high, the first chamber 31B:1 at the left stabilisation actuator 31B is exposed to a high pressure. When the pressure at the first chamber 31B:1 at the left stabilisation actuator 31B increases, the pressure influences the piston, and the first chamber 31B:1 is expanded. A force is in this way created that is opposed to the force that influences the left tipping actuator 22B. Since the pressure at the second chamber 22A:2 at the right tipping actuator 22A is high, the second chamber 31A:2 at the right stabilisation actuator 31A will, in the same way, be exposed to a high pressure. The pressure in the second chamber 31A:2 at the right stabilisation actuator 31A influences in this way the piston 46 such that the first chamber 31A:1 is reduced. This fluid-mediated connection that operates with a relatively high pressure and lies between the opposite chambers of the said tipping actuators 22A, 22B and stabilisation actuators 31A, 31B is illustrated in the drawing by a solid line. A force is in this way created that is opposed to the force that influences the right tipping actuator 22A. The opposing forces to which the stabilisation actuators 31A, 31B give rise counteract the torque that influences the tipping arrangement 20. The counteracting forces of the stabilisation actuators 31A, 31B are directly proportional to the torque, and ensure in this way that the vehicle does not tip over in the direction of the crane.

The present invention concerns also a method for the stabilisation of a vehicle that comprises a system for the stabilisation of a vehicle of the type that is described in FIGS. 3 and 4.

The method comprises the step a) to control the two stabilisation actuators 31A, 31B on the basis of the pressure at two tipping actuators 22A, 22B at the tipping arrangement 20 by ensuring that the stabilisation actuators are in fluid-mediated connection with the tipping actuators, whereby the tipping actuators are arranged in connection with the tipping plate 25, such that the tipping plate can be rotated, relative to the chassis, around a horizontal axis 23, 24.

It is appropriate that the method concern a method for the stabilisation of a vehicle in which the vehicle comprises a chassis 1 with a forward wheel bogie 8 and a rear wheel bogie 2. The vehicle comprises further a crane that is arranged at the tipping arrangement 20. It is appropriate that the vehicle be further equipped with a cabin 17 that also is arranged at the tipping arrangement 20. The chassis 1 of the vehicle may be constituted by a forward frame 14 and a rear frame 15, whereby the forward wheel bogie is arranged at the forward frame and the rear wheel bogie is arranged at the rear wheel bogie. It is appropriate that the tipping arrangement 20 be arranged at the forward frame 14 of the chassis and that the stabilisation arrangement 30 be therefore arranged at the rear frame 15.

Each tipping actuator 22A, 22B may be constituted by a double-action cylinder comprising a piston 36 and a piston rod 37, such that a first chamber 22A:1, 22B:1 is formed at a first side of the piston and a second chamber 22A:2, 22B:2, which encloses the piston rod 37, is formed at a second side of the piston. Each stabilisation actuator 31A, 31B may in the same way be constituted by a double-action cylinder comprising a piston 46 and a piston rod 47, such that a first chamber 31A:1, 31B:1 is formed at a first side of the piston and a second chamber 31A:2, 31B:2, which encloses the piston rod, is formed at a second side of the piston.

According to the method, the first chamber 31A:1; 31B:1 at the relevant stabilisation actuator 31A, 31B may be placed in fluid-mediated connection with the first chamber 22A:1, 22B:1 at the relevant tipping actuator 22A, 22B, and the second chamber 31A:2, 31B:2 at the relevant stabilisation actuator 31A, 31B in fluid-mediated connection with the second chamber 22A:2; 22B:2 at the relevant tipping actuator 22A, 22B. It is in this way ensured that the first chamber 31A:1 at one of the stabilisation actuators 31A is in fluid-mediated connection with the first chamber 22A:1 at one of the tipping actuators 22A, and that the first chamber 31B:1 at the second stabilisation actuator 31B is in fluid-mediated connection with the first chamber 22B:1 at the second tipping actuator 22B. The said interacting stabilisation actuators 31A and 31B and tipping actuators 22A and 22B are arranged for each circuit one on each side of the centre line of the vehicle and in fluid-mediated connection with each other.

The method may comprise to set two, first and second, stabilisation valves 40A, 40B to an open condition, whereby each stabilisation valve is arranged in fluid-mediated connection with the relevant stabilisation actuator 31A, 31B and the relevant tipping actuator 22A, 22B. It is appropriate that each stabilisation valve 40A, 40B be arranged when in its current-carrying condition to be in fluid-mediated connection with the first chamber 31A:1, 31B:1 at a stabilisation actuator 31A, 31B and a tipping actuator 22A, 22B. It is appropriate that the second chamber 31A:2, 31B:2 at the relevant stabilisation actuator 31A, 31B be always in fluid-mediated connection with a tipping actuator 22A, 22B, without it being required that a stabilisation valve 40A, 40B be opened. It may be conceived as an alternative that the stabilisation valves 40A, 40B be arranged in fluid-mediated connection with the relevant second chambers 22A:2, 22B:

2; 31A:2, 31B:2 of the stabilisation actuators 31A, 31B and tipping actuators 22A, 22B. It is appropriate that the stabilisation valves be controlled by an electronic control unit.

The method may comprise the step b) to lock the stabilisation arrangement 30 by stopping the fluid-mediated connection between the first chambers 31A:1, 31B:1 and/or second chambers of the stabilisation actuators 31A, 31B and the first chambers 22A:1, 22B:1 and/or second chambers of the tipping actuators 22A, 22B. It may be desirable in special operating conditions, for example when the vehicle is stationary or is switched off, to lock the stabilisation arrangement 30 in order to maintain the counteracting force from the stabilisation actuators. By stopping the fluid-mediated connection between either the first chambers or the second chambers of the stabilisation actuators 31A, 31B and the tipping actuators 22A, 22B, the pressure at the chambers of the stabilisation actuators be maintained and the counteracting force of the stabilisation actuators be locked such that no flow-mediated exchange takes place through the stabilisation valve 40A, 40B. It is appropriate that the stabilisation arrangement be locked through the control unit setting the stabilisation valves to a normal condition in which no current flows, as is shown in FIG. 5, when the vehicle is switched off.

The invention claimed is:

1. A system for the stabilisation of a vehicle with a chassis, the chassis comprising:
    a rear wheel bogie, with a pendulum shaft that can be rotated, through rotary bearings, around an axis that extends parallel to a longitudinal direction (CL) of the vehicle;
    a tipping arrangement arranged at the chassis and a crane arranged on the tipping arrangement, wherein the tipping arrangement further comprises a rotating disk arranged on rotary bearings on a tipping plate such that the rotating disk and the crane can rotate around a vertical axis; and
    a hydraulic stabilisation arrangement comprising first and second hydraulic stabilisation actuators arranged at the rear wheel bogie, wherein:
        the rear wheel bogie comprises two pairs of wheels, one pair on each side of the longitudinal axis of the vehicle, the rear wheel bogie can be rotated, through the bogie arm of the rear wheel bogie and a rotation joint located at the centre of the bogie arm, around a horizontal axis that extends perpendicular to the longitudinal direction of the vehicle,
        the tipping arrangement further comprises first and a second hydraulic tipping actuators arranged in connection with the tipping plate, wherein the tipping plate and the rotating disc can be rotated relative to the chassis around a horizontal axis under a torque that is generated depending on the position of the crane relative to a centre line CL, and
        the first stabilisation actuator and the first tipping actuator are arranged in fluid-mediated connection, the second stabilisation actuator and the second tipping actuator are arranged in fluid-mediated connection, and wherein the pressure at the stabilisation actuators are controlled on the basis of the pressure at the tipping actuators caused by the position of the crane.

2. The system according to claim 1, wherein the first and second tipping actuators are arranged one on each side of the longitudinal direction (CL) of the vehicle.

3. The system according to claim 2, wherein the first and second stabilisation actuators are arranged in fluid-mediated connection in a circuit with the corresponding first and second tipping actuators, where the first and second circuits are located one on each side of the longitudinal direction (CL) of the vehicle.

4. The system according to claim 1, wherein the first and second stabilisation actuators are arranged one on each side of the longitudinal direction (CL) of the vehicle.

5. The system according to claim 1, wherein the first and second tipping actuators are so arranged that the rotating disk arranged on the tipping plate can be rotated around any one of the following axes: a horizontal axis parallel to the longitudinal direction (CL) of the vehicle, a horizontal axis perpendicular to the longitudinal direction (CL) of the vehicle, or in a cardan manner around two perpendicular axes including a combination of the horizontal axes.

6. The system according to claim 5, wherein the tipping arrangement comprises a tipping link including a unit with an aid of which the tipping plate is suspended in a cardan manner and rotationally displaceable around two perpendicular axes including the horizontal axis, parallel to the longitudinal direction of the vehicle, and the horizontal axis, perpendicular to the longitudinal direction of the vehicle.

7. The system according to claim 1, wherein a cabin is arranged at the tipping arrangement.

8. The system according to claim 1, wherein each tipping actuator is constituted by a double-action cylinder comprising a piston and a piston rod, wherein a first chamber is formed at a first side of the piston, and a second chamber, which encloses the piston rod, is formed at a second side of the piston.

9. The system according to claim 8, wherein the first chamber at each stabilisation actuator is arranged in fluid-mediated connection with the first chamber at the tipping actuator that is arranged on the same side of the centre line (CL) of the vehicle, while the second chamber at each stabilisation actuator is arranged in fluid-mediated connection with the second chamber at the tipping actuator arranged on the same side.

10. The system according to claim 1, wherein each stabilisation actuator is constituted by a double-action cylinder comprising a piston and a piston rod, wherein a first chamber is formed at a first side of the piston, and a second chamber, which encloses the piston rod, is formed at a second side of the piston.

11. A vehicle, comprising the system according to claim 1.

12. The vehicle according to claim 11, wherein the vehicle is a terrain-going vehicle, in particular a forestry machine equipped with a crane.

13. The vehicle according to claim 11, wherein the chassis of the vehicle comprises a forward frame and a rear frame connected through an articulated joint wherein the tipping arrangement is arranged at the forward frame and the stabilisation arrangement is arranged at the rear frame.

* * * * *